United States Patent [19]
Nelson

[11] 3,939,865
[45] Feb. 24, 1976

[54] DIVERTER SPOUT VALVE MECHANISM
[75] Inventor: Merritt J. Nelson, Sparta, Mich.
[73] Assignee: Zin-Plas Corporation, Grand Rapids, Mich.
[22] Filed: May 13, 1974
[21] Appl. No.: 469,314

[52] U.S. Cl................................ 137/467; 251/368
[51] Int. Cl.² .......................................... F16K 15/00
[58] Field of Search...................... 137/467; 251/368

[56] References Cited
UNITED STATES PATENTS

| | | | |
|---|---|---|---|
| 2,022,875 | 12/1935 | Zinkil.............................. | 137/467 X |
| 3,012,251 | 12/1961 | Fife............................... | 137/467 UX |
| 3,387,816 | 6/1968 | Holycross.......................... | 251/175 |
| 3,576,197 | 4/1971 | Bastian........................... | 137/467 X |

Primary Examiner—Harold W. Weakley
Attorney, Agent, or Firm—McGarry & Waters

[57] ABSTRACT

A diverter spout valve mechanism comprises a hollow pressure chamber having an inlet, an outlet on a vertical wall spaced from the inlet, and a vertically movable valve member formed of a moldable plastic or similar light weight material mounted in the outlet. The valve member is movable from an open position, wherein the valve member is substantially below the outlet and the outlet is open, to a closed position, wherein the valve member is raised so as to block the outlet. The valve member is formed so that when the valve member is in the open position, the flow of liquid through the spout exerts a downward force on the valve member and causes the valve member to remain in its open position. The valve member includes a vertically disposed face plate mounted inside the pressure chamber adjacent the outlet, with the face plate comprising a curved bottom that mates with the interior surface of the pressure chamber when the valve member is open; a back face that slides across the wall containing the outlet to seal the outlet when the valve member is closed; and a front face that tapers upwardly and outwardly from the bottom of the face plate to a downwardly curved frontal cavity adjacent the top of the valve member. A connecting web extends from the face plate through the outlet to a body mounted adjacent the outlet on the outside of the pressure chamber. A pair of vertically disposed vanes are attached to the body and extend away from the outlet in order to minimize turbulence on the outside of the pressure chamber.

7 Claims, 5 Drawing Figures

DIVERTER SPOUT VALVE MECHANISM

BACKGROUND OF THE INVENTION

1. Field of the Invention

This invention relates to a diverter spout and more specifically to an improvement in a diverter spout valve member.

2. Description of the Prior Art

A diverter spout is a conventional bathroom fixture which is usually mounted above a bathtub for diverting the flow of water away from the spout to an overhead shower fixture by a simple raising or lowering of a valve member. One type of diverter spout includes corrosion resistant metal housing and has a diverter valve mechanism mounted therein adjacent the fluid input end of the spout. The diverter valve mechanism includes a pressure chamber having an inlet and an outlet, with a movable valve member at least partially disposed within the pressure chamber being selectively actuatable to open and close the outlet of the pressure chamber.

An improved diverter spout construction that has heretofore been employed by applicant's assignee is shown in Bastian U.S. Pat. No. 3,576,197, dated Apr. 27, 1971. In the Bastian structure, the pressure chamber is formed of integrally molded plastic components. However, it was not possible to replace the heavy metal valve member in this type of diverter valve with an inexpensive plastic counterpart, because the weight of the metal valve member was necessary to hold the valve in an open position during the normal operation of the spout. In this type of diverter valve, the valve member normally is disposed beneath the outlet when water is permitted to flow through the spout, with the valve member being raised to cover the outlet opening when water is to be diverted from the bathtub spout to the shower fixture. When the valve member is raised, the water pressure forces the valve member against the outlet of the pressure chamber with sufficient force to hold the valve member in its raised position. When the water is turned off, the weight of the valve member causes the valve to fall downwardly to its open position, thus automatically reopening the spout when the shower is turned off.

Attempts have been made heretofore to make the heavy metal valve member from a light weight plastic material. However, with such designs water turbulence resulting from water flowing through the spout results in an upward force on the valve member that causes the valve member to automatically rise undesirably to a closed or semi-closed position during normal operation of the spout. This impairs the flow of liquid through the diverter spout and causes a diverting action when none is desired.

SUMMARY OF INVENTION

In accordance with the present invention, an improved diverter spout mechanism comprises a hollow pressure chamber with an inlet and an outlet on a substantially vertical wall, with a vertically movable valve member integrally formed of moldable plastic or similar light weight material, mounted in the outlet. A vertically disposed face plate is mounted adjacent to the vertical wall with the outlet in the interior of the pressure chamber, and a connecting web extends from the face plate through the outlet. A body is connected to the connecting web adjacent to the outlet on the outside of the pressure chamber. The valve member has an open position below the outlet and a closed position over the outlet and is formed so that when the valve member is placed in its open position, the flow of liquid through the spout past the valve member causes the valve member to remain in its open position by applying a net downward force on the face plate.

The face plate is shaped so that the water flowing through the outlet supplies a net downward force on the face plate to keep it in the open position. The face plate includes a curved bottom portion that mates with the interior surface of the pressure chamber when the valve member is opened, so as to minimize the upward liquid force against the bottom of the face plate when the valve is open. A back face on the face plate is formed so as to be slidable across the outlet to form a sealing relationship with the outlet when the valve member is closed. A front face on the face plate faces the interior of the chamber and extends upwardly and preferably tapers at the same time from the bottom of the face plate to a downwardly curved frontal cavity adjacent to the top of the valve member. The shape of the face plate alters water flow patterns so as to prevent the water from raising the valve means when no diverting action is desired.

Another feature of the present invention is the inclusion of at least one vertically disposed guide or vane attached to the body and extending away from the outlet. Preferably, a pair of vertically disposed parallel vanes are attached to the body. These vanes minimize the water turbulence and resultant upward forces on the valve member outside the pressure chamber.

These and other advantages and features of the present invention will hereinafter appear, and for purposes of illustration, but not of limitation, a preferred embodiment of the present invention is described in detail below and is shown in the appended drawings.

BRIEF DESCRIPTION OF THE DRAWINGS

The invention will now be described with reference to the accompanying drawings in which.

DESCRIPTION OF THE PREFERRED EMBODIMENT

Figure 1:
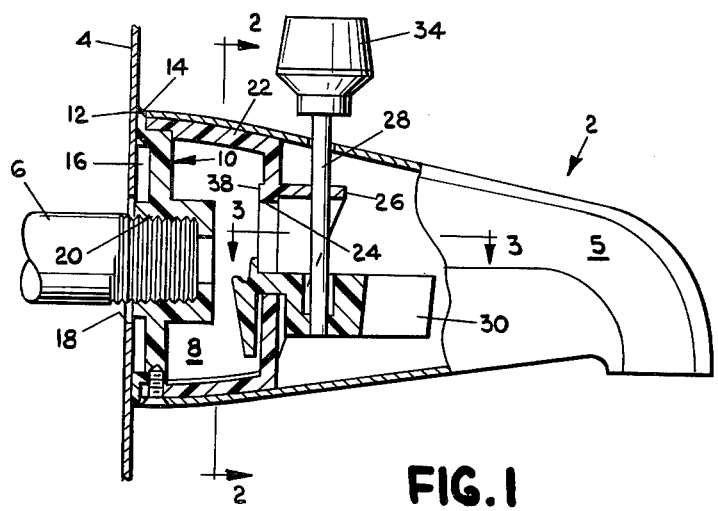
FIG. 1 is a side elevational view, partly cut away, of a diverter spout according to the invention, illustrating the diverter valve in the opened position.
Figure 2:
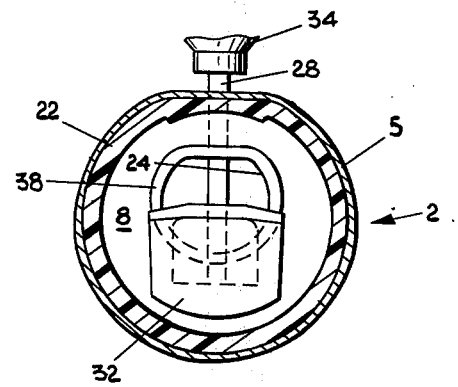
FIG. 2 is a cross-sectional view taken along lines 2—2 of FIG. 1.
Figure 5:
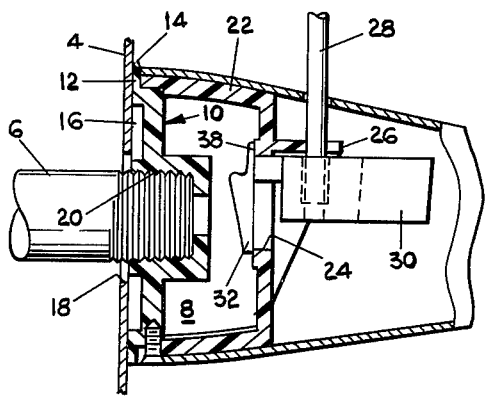
FIG. 5 is a partial view like FIG. 1 showing the valve in the diverting or closed position.
Figure 3:
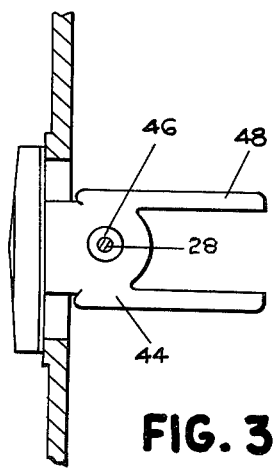
FIG. 3 is a partial sectional view taken along lines 3—3 of FIG. 1.

Referring now to FIGS. 1 and 2, a diverter spout 2 is illustrated mounted on a wall 4. A fluid input pipe 6 is threaded into a pressure chamber 8 of the diverter spout so that fluid may flow through the spout when the diverter valve is in an open position as illustrated in FIG. 1. The pressure chamber 8 comprises a first member 10, which is substantially circular. The outer contour of first member 10 is approximately equivalent to the outer contour of the opening in the spout housing 5 directly adjacent the wall 4. An outer rim 12 of the first member 10 forms a lip against which the outer rim 14 of the diverter spout housing 5 seats. The diverter spout housing 5 is composed of metal and the pressure chamber 8 is composed of plastic, so that outer rim 12 prevents the diverter spout housing from scuffing the wall 4 against which the spout is mounted. The plastic, which is softer than the tile which it contacts, protects the wall against scuffing and scratching by the spout when the spout is installed. The spout can thus be screwed onto the threaded end of pipe 6 without marring the tile. Inwardly from the outer rim 12 of first member 10 is an annular recessed cavity 16 which is suitable for packing with a sealing material to prevent leakage of fluid from between the outer rim 12 and the wall 4.

The fluid input pipe 6 extends through an opening 18 in the wall 4 and engages a threaded portion 20 of the first member 10 in order to deliver fluid to the pressure chamber 8. An outlet port 21 in the end of threaded portion 20 provides fluid communication between input pipe 6 and the interior of pressure chamber 8.

The pressure chamber also includes a cup shaped second member 22, which is substantially circular in cross section. Second member 22 has tapered sidewalls 23 that fit snugly within the tapering spout housing 5, an open end at the left hand side, and a vertically disposed wall or end plate 25 that encloses the front or right hand end of the pressure chamber. End plate 25 is spaced apart from opening 21 in first member 10 and includes a rounded outlet opening 24 having a flattened top surface. Outlet opening 24 provides an outlet from the pressure chamber to the outlet of the spout.

The first member 10 of the pressure chamber 8 is ultrasonically welded to the open end of the cup shaped second member 22 of the pressure chamber 8 along the border formed by the inner surface of the outer rim 12 of first member 10. The ultrasonic weld assures the integrity of the joint between the pressure chamber's first and second members and prevents any leakage of fluid from the pressure chamber.

A shoulder 26 extends horizontally to the right (FIG. 1 orientation) from second member 22 and has a vertical opening therein through which a valve stem 28 extends. Valve stem 28 includes an inner end that is removably attached to a valve member 30 and an outer end on which a knob 34 is mounted. Valve stem 28 can be attached to the valve member by being provided with a threaded inner end that mates with an internally threaded opening in the valve stem.

Valve member 30 is of light weight construction and is preferably made from a plastic material of the same nature as the pressure chamber 8. Suitable materials are Marbon Cycolac ABS grade X-27 or Kralastic 2926.

Valve member 30 comprises a face plate 32 vertically disposed in the pressure chamber, with the face plate including a flat back face 34 that abuts a sealing ring 50 on the second member 22 and a contoured front face 36 that faces the interior of the pressure chamber.

Front face 36 slopes upwardly and outwardly from the bottom of face plate 32 and terminates in a downwardly curved frontal cavity 40 that curves downwardly from an upper lip 41 and then upwardly to a portion 43 that forms the top of face plate 32. The bottom 38 of face plate 32 is arcuate in shape and conforms substantially to the interior curved shape of the member 22, as illustrated in FIG. 2. Bottom 38 is formed so that when the valve is open, the bottom seats against the casing.

A connecting web 42 connects the face plate 32 with a body 44 having a threaded vertical bore 46, which threadably engages the threaded inner end of stem 28. A pair of vertically disposed vanes of guides 48 extend rearwardly from the outer sides of the body 44 to minimize water turbulence as it passes forwardly from opening 24.

In operation, the valve is normally in the position illustrated in FIG. 1, with the water passing through the inlet pipe 6 into the pressure chamber 8. The water then passes through outlet opening 24 and thereafter out the outlet opening of the spout. As the water flows over body 44 and past the guides 48, turbulence in the water and resultant upward forces on the diverter valve 30 are minimized.

Figure 4:
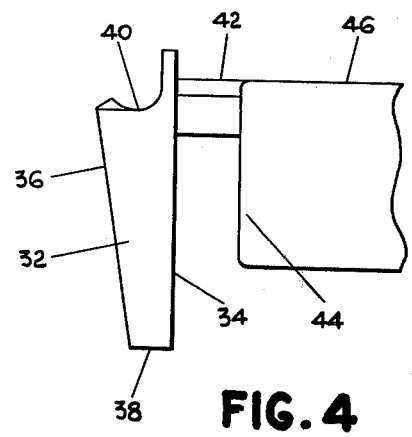
FIG. 4 is an enlarged partial view of the diverter plate illustrated in FIG. 1.

Further, as the water passes over the top of the face plate 32, a bottom portion of the water stream will be directed downwardly into the frontal cavity 40 in a clockwise motion as viewed in FIG. 4. This flow of water tends to provide a downward force on the face plate 32 to maintain the face plate in its lowered or open position. Also, because the rounded bottom 38 seats against the bottom of the member 22, no upward water pressure is exerted on the bottom of the face plate 32.

With the use of the unique design of the face plate 32 and the guides or vanes 48, the diverter valve can be molded entirely from a light weight, synthetic plastic and the valve member will remain in its open or closed position until the operator desires to alter the diverting action of the valve. Heretofore, diverter valve members for this type of valve have been made of a heavy metal in order to resist a natural upward pressure of the water which tended to lift lighter valve members upwardly to their open positions during normal operation of the valve. The use of the valve member design of the present invention permits the use of an inexpensive molded plastic part instead of an expensive and bulky metal component, and this greatly reduces the manufacturing cost of the valve structure.

Reasonable variation and modification are possible within the scope of the foregoing disclosure, drawings, and appended claims, without departing from the spirit and scope of the present invention.

The embodiments of the invention in which an exclusive property or privilege is claimed are defined as follows:

1. In a diverter spout comprising a hollow pressure chamber having an inlet and a substantially vertical wall with an outlet; a vertically movable valve member including a face place mounted for reciprocable movement between an open position wherein the face plate is substantially below the outlet so as to permit liquid to flow from the pressure chamber through the outlet, and a closed position wherein the face plate is raised so as to block the outlet from the inside of the pressure chamber; and a manually actuatable valve stem means connected to the valve member for opening and closing the valve member; an improvement in said valve member which comprises:

the valve member being integrally formed of a light weight plastic material and the face place thereof having a downwardly curved frontal cavity at an upper portion of said face plate for reacting with the flow of water through the outlet such that the water flowing through the outlet applies a downward force on the valve member to hold it in the open position when water flows through the outlet.

2. A diverter spout as claimed in claim 1 wherein the face plate comprises:

a curved bottom that mates with the interior surface of the pressure chamber when the valve member is in the open position;

a back face opposing the outlet and formed so as to be slidable across the outlet to form a sealing relationship therewith when the valve member is closed; and a front face that faces the interior of the pressure chamber and extends upwardly from the bottom of the face plate to the downwardly curved frontal cavity in the front face adjacent to and below the top of the valve member.

3. A diverter spout as claimed in claim 2 wherein the front face of the face plate tapers upwardly and outwardly as it extends upwardly from the bottom of the face plate.

4. A diverter spout as claimed in claim 2 wherein the valve member further comprises a body connected by a web to the face plate adjacent to the outlet on the outside of the pressure chamber, the body including vertically disposed guide means connected to the body and extending away from said outlet, said guide means being adapted to reduce liquid turbulence outside the outlet.

5. A diverter spout as claimed in claim 4 wherein the body is positioned substantially below the outlet when the valve member is open and the guide means comprise a pair of integrally formed and vertically disposed parallel vanes attached to opposite sides of the body and said vanes positioned so as to be disposed below the outlet when the valve member is in the open position.

6. A diverter spout as claimed in claim 1 wherein the pressure chamber comprises:

a circular first member formed of moldable plastic, with the inlet being a threaded central opening therein that engages a threaded input pipe extending from a wall; and a cup shaped second member formed of moldable plastic and having an open end that is sealingly attached to the outer periphery of the first member and a closed end spaced apart from the first member, said outlet being formed in the closed end of the second member.

7. A diverter spout as claimed in claim 1 wherein:

the valve stem means comprises a vertically disposed valve stem having a threaded inner end inside the spout and an outer end extending outside the spout through an opening in the spout; and the means for attaching the valve stem means to the body is a vertically disposed threaded opening in the body that threadably receives the inner end of the valve stem.

* * * * *